United States Patent [19]

Garcia et al.

[11] Patent Number: 4,881,057

[45] Date of Patent: Nov. 14, 1989

[54] TEMPERATURE SENSING APPARATUS AND METHOD OF MAKING SAME

[75] Inventors: Richard R. Garcia; Royal H. Sites, both of Plano, Tex.

[73] Assignee: Ranco Incorporated, Dublin, Ohio

[21] Appl. No.: 101,656

[22] Filed: Sep. 28, 1987

[51] Int. Cl.4 .............................................. H01C 3/04
[52] U.S. Cl. ........................................................ 338/28
[58] Field of Search .................... 338/28, 22 R, 25 SP; 374/183, 185, 184; 29/611, 612; 219/121 L, 121 LM, 121 LH, 121 LJ, 121.69

[56] References Cited

U.S. PATENT DOCUMENTS

| | | | |
|---|---|---|---|
| 4,085,399 | 4/1978 | Wall | 338/200 |
| 4,186,368 | 1/1980 | White et al. | 338/28 |
| 4,670,734 | 6/1987 | Caddock | 219/121.69 |

Primary Examiner—Clifford C. Shaw
Assistant Examiner—M. M. Lateef
Attorney, Agent, or Firm—Watts, Hoffmann Fisher & Heinke

[57] ABSTRACT

A temperature sensor. Two thick film resistor elements are mounted to a substrate and then a thermistor coupled to those elments to form a voltage divider. The resistance of the thermistor is determined at a reference temperature and the thick film resistor elements are precisely trimmed using a laser trimming system to produce a precision voltage divider. To sense temperatures the voltage divider is energized and its resistance ratio is sensed utilizing a bridge circuit.

19 Claims, 4 Drawing Sheets

TEMPERATURE SENSING APPARATUS AND METHOD OF MAKING SAME

TECHNICAL FIELD

The present invention relates to a temperature sensor and more particularly to a precision temperature sensor and its fabrication.

BACKGROUND ART

Temperature sensors incorporating thermistors whose resistance changes with temperature are commonly used. Thermistors have either a positive or a negative temperature coefficient. A positive temperature coefficient means that the resistance of the thermistor increases with increased temperature. A negative coefficient means the thermistor resistance decreases with increasing temperature.

In a typical prior art configuration, the thermistor is series coupled with a known resistance to form a voltage divider. A known voltage is applied across the voltage divider and the voltage at an output junction between the known resistance and the thermistor is measured to determine the thermistor temperature. The temperature is derived from the output junction voltage since that voltage varies with thermistor resistance which is directly related to the thermistor temperature.

Thermistors are calibrated by their manufacturers and a table of thermistor resistances at different temperatures are sent to the customer with each thermistor. Generally the tabulated thermistor resistances are accurate within 10–20 percent at a given temperature. Very accurately calibrated "precision" thermistors are available at substantially increased cost. If precision thermistors are matched with resistors whose resistance is known to a high degree of accuracy (i.e., "precision" resistors) a precision voltage divider can be constructed.

Resistors can be adjusted or trimmed extremely accurately to produce "precision" resistors. Trimming can be accomplished in various ways. For example, the resistance of wire wound resistors is trimmed by adjusting the number of windings that make up the resistor. Thick film resistors deposited on substrates are sometimes trimmed by adjusting the locations of conductive connector fingers along the resistor (see U.S. Pat. No. 4,085,399) and sometimes by physically removing thick film resistance material until a desired precise resistance value is achieved.

Highly accurate electronic temperature sensors have, in the past, required the use of precision thermistors and precision resistors coupled together in voltage divider or wheatstone bridge networks. Because of the high initial cost of components and because careful matching of components having precisely determined values was required to produce sensor networks having characteristics which were consistent from network to network, electronic temperature sensor networks of the character referred to have not been available in large quantities at low cost.

Furthermore, many of the prior art temperature sensors were so constructed and arranged that mechanical stresses tended to be transferred to the thermistors during use. The applied stresses altered the thermistor resistance characteristics, frequently decalibrating the temperature sensor networks.

DISCLOSURE OF THE INVENTION

The present invention provides a new and improved precision temperature sensor and manufacturing process for producing that sensor. The temperature sensor is constructed by forming a voltage divider having first and second segments coupled together at an output junction. The first segment includes a thermistor element having a resistance which varies with temperature and the second segment includes a monolithic resistor element fixed to a substrate. The thermistor is maintained at a precisely known reference temperature while its resistance is measured with a high degree of accuracy. The associated resistor element is then precisely trimmed to produce a precise resistance ratio between the first and second voltage divider segments at the reference temperature.

The new sensor is precisely accurate at the reference temperature even though the thermistor is not a "precision" thermistor. If a temperature sensor is desired for sensing a predetermined set point temperature, a sensor constructed according to the present invention can be supplied which does not employ discrete precision resistors or a precision thermistor, yet which is highly accurate in sensing the set point temperature.

The new sensor is constructed by encapsulating the voltage divider with an elastomeric substance which prevents transmission of stresses to the voltage divider segments throughout the relatively wide operating temperature range of the sensor (e.g., from minus 40° C. to 100° C.).

In accordance with one embodiment of the invention, a second monolithic resistor element is coupled in parallel with the thermistor element to form the first voltage divider segment. In this embodiment, both resistor elements are precisely trimmed or adjusted to produce a specific ratio between the voltage divider segments at the reference temperature. Adjusting the parallel monolithic element resistance controls the range of sensed voltage divider resistance ratios and can be used to linearize the sensor output over relatively wide temperature ranges.

The monolithic resistor elements and thermistor are mounted to a substrate with the monolithic resistance elements formed by a thick film application technique. The nominal resistance of the deposited elements is chosen based upon a nominal thermistor resistance designated by the thermistor manufacturer at a particular temperature. The substrate is immersed in a precision temperature controlled bath and the thermistor resistance precisely measured. Based upon this measurement the resistor elements are trimmed from their nominal values (for example by removing deposited resistor material by use of a controlled laser beam) to produce a voltage divider having highly accurate outputs particularly around the reference temperature. The substrate is then assembled to a sensor housing and potted with a material which remains resilient and pliable throughout a wide temperature range to avoid application of mechanical stresses to the thermistor and/or the substrate.

In a preferred form of the invention a large number of sensors, formed by voltage divider networks on small substrates, is maintained at a precisely known temperature in a calibrating bath while the resistance of successive thermistors is accurately measured and recorded. Respective network resistors are thereafter successively trimmed to precise resistance values, based on the associated thermistor resistance value recorded at the calibration temperature, so that the voltage divider output signal is precisely accurate at the calibration bath temperature. This procedure enables the construction of commercial quantities of relatively small, extremely accurate temperature sensors from low precision components.

Other advantages and features of the invention will become better understood from the following detailed description of a preferred embodiment of the invention.

BEST MODE FOR CARRYING OUT THE INVENTION

Turning now to the drawings, FIGS. 1–4 illustrate a temperature probe P constructed according to the invention including a precision temperature sensor 10 (FIG. 4) disposed in a probe housing 11 and supported within the probe housing 11 by a protective body 12 of elastomeric material. The illustrated probe P is constructed and arranged so that it can be mechanically secured in heat transfer relationship to a heat exchanger, or the like, and electrically connected to a control circuit so that operation of the control circuit is governed according to the heat exchanger temperature as sensed by the probe P.

The sensor 10 includes a temperature responsive voltage divider network, a small substrate 14 supporting the network, and electrical leads connected to the network via the substrate. The voltage divider network comprises resistor elements R1, RX, RT mounted on the substrate 14 (see FIG. 4). The resistor elements R1, RX are precision trimmed monolithic resistors deposited on the substrate while the third resistor element, RT, is a thermistor whose resistance RT varies with temperature. The thermistor is soldered to the substrate 14.

Figure 1:
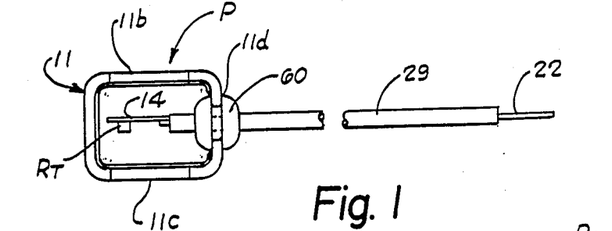
FIG. 1 is a plan view of a temperature probe having a temperature sensor supported in a probe housing prior to encapsulation of the sensor.

The electrical leads are preferably attached to the probe housing 11 so that the sensor 10 can be supported within the housing 11 by the leads during encapsulation by the body 12. Thus, the leads position the sensor 10 away from contact with the probe housing walls while providing for an electrical connection between the sensor and the control circuitry. The leads include electrical conductors 22, 24, 26 attached to the sensor 10. The conductor 24 carries output signals from an output junction 28 interposed between the resistor R1, and the parallel combination of the resistor RX and thermistor RT. The voltage divider network is connectable across a power supply by the conductors 22, 26. In the illustrated embodiment of the invention the conductors 22, 24, 26 are disposed in a common insulator conduit 29 which is mechanically secured to the probe housing.

Figure 2:
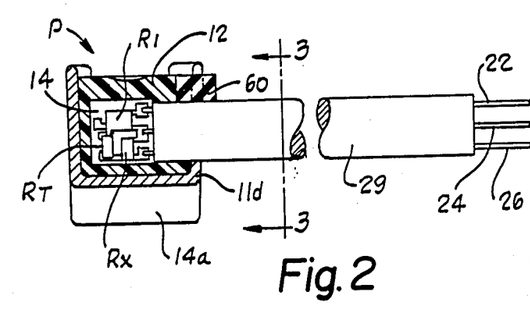
FIG. 2 is a cross sectional view of the FIG. 1 probe after the sensor is encapsulated, seen approximately from the plane indicated by the line 2—2 of FIG. 3.
Figure 3:
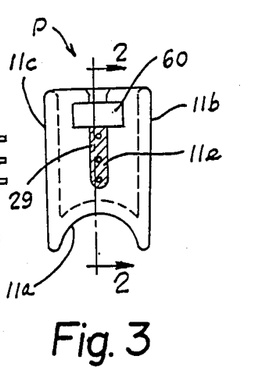
FIG. 3 is a cross sectional view seen from the plane indicated by the line 3—3 of FIG. 2.

The probe housing 11 is constructed to support and protect the sensor 10 while positioning the sensor for efficient heat transfer with an object or medium whose temperature is being monitored. The disclosed housing is formed from a heat conductive material and constructed for mounting in direct contact with a heat exchanger tube, or the like, (not shown). The illustrated housing is a generally box-like cast member having an open top and a cylindrically curved bottom wall 11a shaped to conform to heat exchanger tube. The housing is preferably cast from zinc or a zinc alloy and physically attached to the heat exchanger tube by clamps, clamping straps, wires or the like so that heat is readily transferred between the heat exchanger through the housing 11 to the sensor 10. Opposite side walls 11b, 11c of the housing 11 are formed with aligned recesses, extending along the open housing side, for receiving the clamping straps or wires reeved around the probe housing and heat exchanger tube.

In the illustrated embodiment of the invention a probe housing wall 11d is formed with a narrow slot 11e which snugly receives the insulator conduit 29 so that the substrate 14 is suspended in the probe housing, cantilever fashion, by the conduit 29 and by the conductors 22, 24, 26 soldered to the substrate. The conduit 29 is resiliently deformed by engagement with the slot and conforms to the shape of the slot.

The conduit 29 is inserted into the probe housing slot 11e and a pliable grommet-like dam 60 is inserted in the slot 11e to both retain the conduit 29 in place while conforming to the slot beyond the conduit and to prevent escape of liquid potting compound poured into the housing to encapsulate the sensor. The potting material is preferably a low durometer elastomer (such as urethane) which cures to form a solid that remains resilient and pliable over the probe operating temperature range (minus 30° C. to 100° C.). The potting material encapsulates the sensor while the sensor remains spaced from the housing walls to reduce mechanical stress on the thermistor and/or the substrate.

Figure 4:
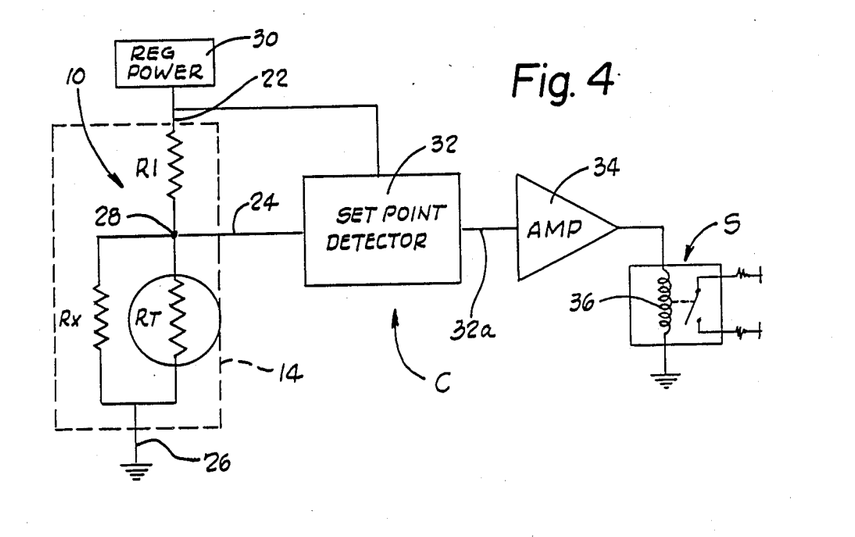
FIG. 4 is a schematic diagram of a temperature sensing circuit including a temperature sensor constructed in accordance with the present invention.

FIG. 4 schematically illustrates the temperature sensor 10 operating in conjunction with a control circuit C for actuating a solenoid controlled switch S in response to sensed temperature. The voltage across the sensor RT is provided by a regulated d.c. power supply 30 via the conductors 22, 26. The preferred power supply 30 provides a precisely controlled constant output voltage. As the temperature of the sensor RT changes, the voltage at the output junction 28 changes due to the change in resistance of the thermistor RT. When the sensor 10 reaches a predetermined, precise "set point" temperature, the voltage at the output junction reaches a precise threshold value at which the control circuit C responds to cause actuation of the switch S. In accordance with a sensor calibration procedure practiced during fabrication of the sensor, a set point ratio of the resistor R1 and the parallel combination of the resistors RX and RT is precisely known at the set point temperature.

The control circuit C comprises a setpoint detector 32 for producing an output in response to a setpoint voltage value at the sensor output junction 28, and an amplifier 34 for energizing the solenoid switch S in response to the set point detector output. The set point detector 32 monitors the voltage at the output junction 28 via the conductor 24. The threshold detector output 32a changes when the output junction voltage indicates the set point temperature has been sensed.

Any conventional or known circuit for detecting a set point indicating voltage level can be utilized in the control circuit C and therefore the detector is only schematically illustrated and described. One suitable circuit forming a set point threshold detector 32 comprises a comparator having one input coupled to the output junction 28 and having a second reference input coupled to a voltage divider with fixed resistors having a resistance ratio equal to the set point ratio of the sensor voltage divider network.

One use of the circuitry depicted in FIG. 4 is as a temperature responsive safety circuit. So long as the sensed temperature is below a safety threshold value the amplifier 34 energizes the solenoid coil 36 and a normally open switch contact is closed. If the temperature of the sensor 10 rises to the safety set point, however, the detector output 32a changes state, and the amplifier 34 de-energizes the coil 36 causing the switch contact to open. This arrangement could be used, for example, to de-activate an electric resistance baseboard heater in response to a sensed, excessive temperature adjacent the heater.

The amplifier 34 can be of any suitable or conventional construction and therefore the amplifier is not illustrated or described in detail. One suitable embodiment of the amplifier 34 includes a switching transistor having its base coupled to the detector output 32a and one or more power transistors for energizing the coil 36.

Representative alternate uses of the sensor 10 include a refrigeration system controls, warning or indicator controls for use in motor vehicle cooling and emissions systems, and controls for home appliances such as hot water heaters, ovens, irons and the like.

Sensor Fabrication

The preferred sensor 10 utilizes a ceramic substrate 14 of the sort commonly used in printed circuit fabrication to support and electrically connect the resistor elements R1, RX, RT (see FIGS. 1 and 2). A conductor network is formed on the ceramic substrate 14 using conventional thick film printing techniques. Conductor networks are formed on a large number of substrates at one time. In a preferred embodiment of the invention each substrate 14 is initially formed as one of a matrix, or array, of substrate areas defined by score lines on a rectangular wafer of substrate material. For example, each wafer can be scored to provide 36 substrate areas in a 6 by 6 matrix.

The resistor elements R1, RX are deposited on each of the substrates using thick film resistor printing techniques. In this procedure a thick film resistor ink is selectively applied to the substrates through a silk screen. The resistance of the deposited monolithic resistors is governed by the geometry of the deposited resistor and the make up of the ink. In the preferred embodiment of the invention the resistors R, RX are applied to each substrate to produce nominal resistance values which are less than their respective expected final values. The first monolithic resistor element R1 is positioned on each substrate 14 to be coupled in series with a thermistor RT. The second monolithic resistor element RX is located to be coupled in parallel to the thermistor.

The substrates, with the conductor networks and monolithic resistor elements R1, RX applied, are fired in a common oven in accordance with well known thick film circuit fabrication procedures.

Next a discrete thermistor RT is soldered to each substrate to complete the network. Because the soldering process induces stresses in the thermistors which can result in thermistor instability over time (i.e., "drifting" of the thermistor resistance at a given temperature) the substrates, with the completed networks in place, are preferably thermally aged for several days before any further fabrication steps are performed. This is preferably accomplished by baking the wafers in an oven at 100° C. for 10 days.

The thermistors RT are not precision thermistors and accordingly the nominal resistance of the thermistors RT is known at a specified temperature to an accuracy ranging between 10 and 20%. This nominal resistance information is provided by the thermistor manufacturer. One suitable thermistor is commercially available from Fenwal Electronics of Framingham, Massachusetts. The silk screening technique used to form the monolithic resistor elements R1, RX is controlled to produce nominal resistance values having a general predetermined relationship to the worst case nominal resistance of the thermistor RT at a specified temperature.

For example, the monolithic elements R1 have a resistance of less than approximately 0.6 times the resistance of a thermistor RT whose actual resistance is 20% less than the nominal resistance of that thermistor at a reference temperature. The second monolithic resistance element RX has a resistance of less than approximately 1.5 times the worst case resistance of the thermistor RT at the reference temperature.

At the next fabrication step, all the substrates are immersed in a liquid bath having a stable, precisely known temperature. In the FIG. 4 application the bath temperature is approximately the same as the set point temperature. The bath is preferably an "electronic liquid" known by the trademark FLOURINERT sold by 3M.

After the substrates have reached the bath temperature the resistance of each thermistor is measured and recorded for later use in conjunction with trimming the resistors R1, RX. In the preferred method electrical probes are stationed in the bath in a matrix configuration and a pair of the probes is engaged across each thermistor when the substrate wafer is immersed in the bath. The resistance of each thermistor is measured to within 0.1% accuracy and the measured resistance is recorded on a floppy disk together with information for identifying the substrate to which the thermistor is mounted. The floppy disc is compatible with an IBM P.C. which can access the resistance value and substrate identity for each respective thermistor. Any suitable arrangement of substrates can be used in the production of sensors according to the invention but in the preferred embodiment the substrate wafer is clamped to a plastic support fixture which is advanced into the bath in accurate alignment with the resistance measuring probe matrix. The substrates are identified by row and column.

Figure 5:
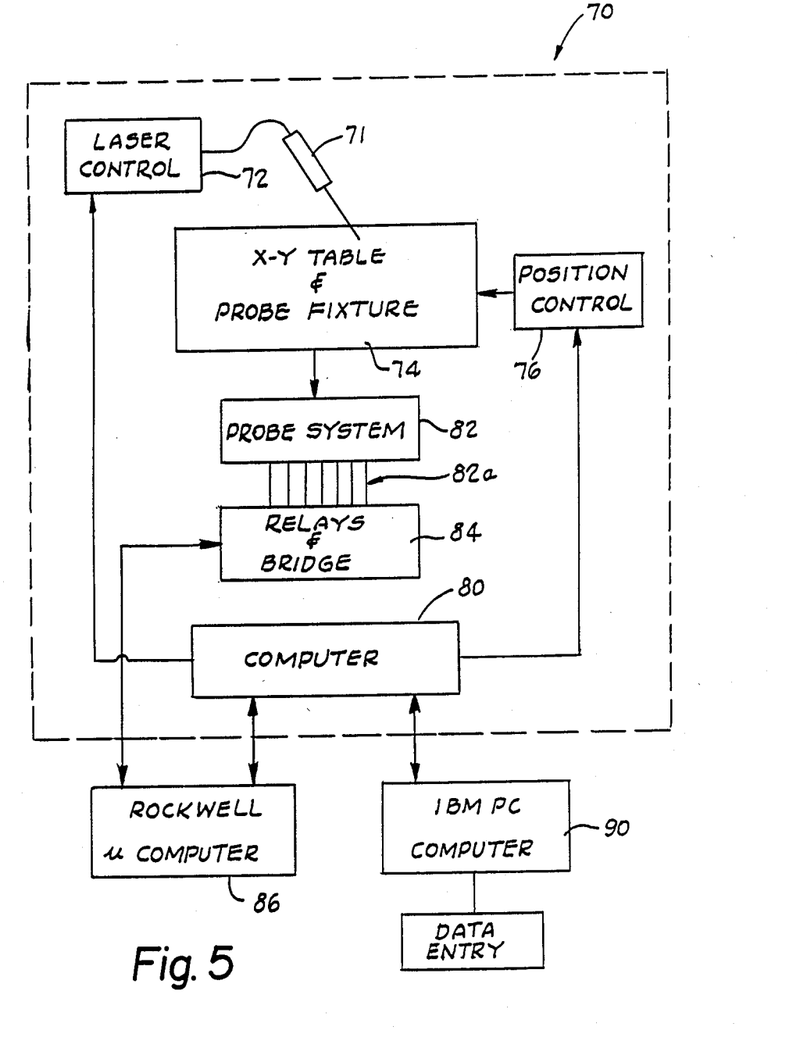
FIG. 5 schematically depicts a laser trimming system for precisely adjusting monolithic resistors utilized in a preferred embodiment of the temperature sensor.

When all the thermistor resistances have been measured and recorded, and the each thermistor has been located, the monolithic resistors of the voltage divider network associated with each thermistor are trimmed to precisely correspond with the thermistor resistance measured at the bath temperature. A trimming system 70 for adjusting the resistance values of the monolithic resistors is schematically illustrated by FIG. 5. The preferred trimming system 70 utilizes a laser for removing resistance material. A Chicago Laser System CLS-33 laser trimmer (indicated within the broken lines of FIG. 5) having a laser 71 and a laser control 72 for turning the laser on and off and moving the laser beam across the surface of a table 74 is preferred. The substrate matrix is positioned on the table 74. A table position control 76 indexes the table 74 in relation to the laser 71 to position each substrate while the laser control 72 directs movement of the laser beam to trim the resistors deposited on a given substrate. Both the laser control 72 and the position control 76 are operated by a computer 80 sold with the Chicago Laser System laser trimming system.

The resistance of each resistor element is monitored during the trimming operation to ensure a precise trimmed resistor value. A probe system 82 includes a fixture having two pairs of probe fingers, each pair engaging the substrate 12 across an associated individual resistor. The probe contact fingers are coupled to conductors 82a routed away from the probe fixture to a relay and bridge circuit 84 for measuring the resistance of the resistor which is across the fingers. A Rockwell microcomputer 86 selectively opens and closes relays to couple the probe fingers to a bridge circuit that senses the resistance of a selected resistor element across the fingers.

The Rockwell microcomputer 86 also receives data via the computer 80 from an IBM PC 90 concerning the resistance at the reference temperature of thermistor 30 associated with each resistor element being trimmed. The Rockwell computer 86 monitors the resistance measured by the bridge circuit 84 until the monolithic resistor element being trimmed has a predetermined value which is precisely determined by the previously measured resistance of the associated thermistor. When this predetermined resistance value is measured the computer 86 signals the computer 80 to stop the trimming operation and initiate trimming of the next succeeding resistor. If the next resistor is on the same substrate as the previous resistor only the laser control 72 is indexed; but if a next resistor is on the succeeding substrate both the position control 76 and the laser control 72 are indexed for trimming the next substrate. For each different substrate the computer 86 utilizes a different respective thermistor resistance from the data stored on a floppy disk which is read by the IBM PC 90.

The laser trimmer adjusts the resistance of the monolithic resistor elements R1, RX relative to the thermistor resistance of the associated thermistor so that the output signal from each sensor 10 at the set point temperature is virtually identical to the output signal from each of the other sensors when at the same temperature.

The resistance of the monolithic resistor elements R1, RX is adjusted by burning away part of each element by the laser beam, a step which increases the resistance of the element in a controlled fashion. During the laser trimming step, the resistance is closely monitored to an accuracy of 0.1% so that after trimming, a large number of virtually identically performing, highly precise voltage dividers has been produced.

Temperature Sensing System

Figure 6:
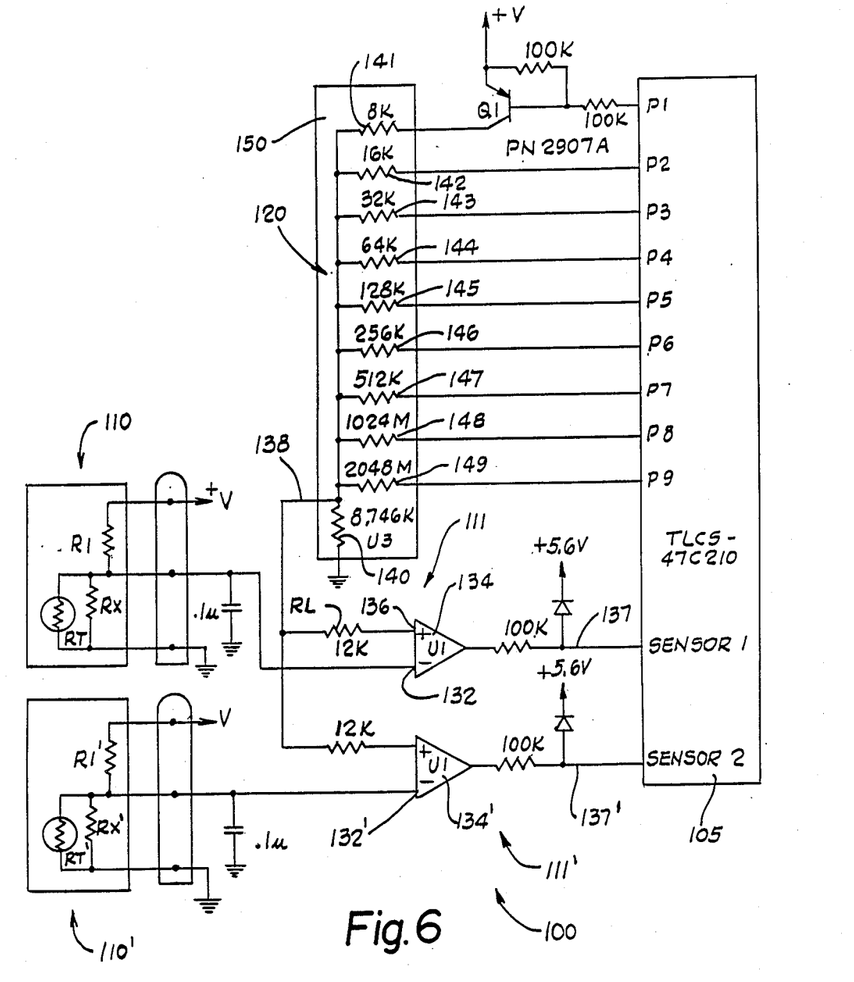
FIG. 6 is a schematic diagram illustrating circuitry for monitoring a range of temperatures using two temperature sensors.

Turning now to FIG. 6, a temperature monitoring system 100 is disclosed for use in sensing temperature ranges of two different mediums rather than a single setpoint temperature. A microprocessor 105 monitors the temperature of two temperature sensors 110, 110' each associated with respective input circuitry, generally indicated by the reference characters 111, 111'. The monitoring system 100 depicted in FIG. 6 is used in conjunction with a demand defrost controller for automatically defrosting a heat pump outdoor heat exchanger coil. The sensor 110 is utilized for monitoring the temperature of the heat exchanger coil and is directly coupled to that coil. The sensor 110' is mounted in close proximity to the heat exchanger coil and monitors outside air temperature during heat pump operation.

The sensors 110, 110' are constructed according to the procedure outlined above and are of identical construction although they function to detect different sensed temperature levels. The associated respective input circuits 111, 111' are also of identical construction. Since the sensors and respective input circuits have the same construction only the sensor 110 and its associated circuitry 111 are described in detail. Components of the sensor 110' and circuit 111' which are common to those of the sensor 110 and circuit 111 are indicated by corresponding primed reference characters.

The sensor 110 includes a thermistor RT, and monolithic resistance elements R1, RX which in combination form a voltage divider that is energized by a voltage source V to produce a sensor output voltage related to a sensed temperature.

A comparator amplifier 134 has in inverting input 132 to monitor an output voltage from the sensor 110. Changes in temperature experienced by the sensor 110 alter the resistance of the sensor thermistor RT causing a change in the inverting input to the comparator amplifier 134.

To determine the temperature of the sensor 110, the microprocessor 105 adjusts the potential at a noninverting input 136 to the comparator 134 and monitors a voltage at a comparator output 137. Adjusting the voltage at the non-inverting input is accomplished by controlling an output 138 from a voltage divider 120. The voltage divider 120 includes a resistance element 140 and a selected parallel combination of nine other resistors 141–149.

Microprocessor input/output pins P1–P9 dictate which resistor elements 141–149 form the voltage divider 120. When microprocessor pin P1 goes low, for example, this turns on a transistor Q1 coupled to the resistor element 142 and produces a reference voltage at the output 138 defined by the resistors 142, 140. The reference voltage is coupled through a resistor RL to the non-inverting input of the comparator amplifier 134.

Microprocessor pins P2–P9 can serve as a current source so that these pins are coupled directly to the resistors 141–149. To determine the resistance ratio and thereby the sensor temperature, the microprocessor selectively controls the state of pins P1–P9 to couple different parallel combinations of the resistors 141–149 to the output 138. The resistor 140 and each of the resistors in the resistor array 141–149 is a precision trimmed monolithic resistor element coupled to a common ceramic mounting substrate 150. Each resistor 141–149 has a resistance twice that of a preceeding resistor. By selective energization of the microprocessor pins P1–P9, 512 ($2^9$) different resistance ratios for the voltage divider 120 are achieved. Different ratios produce different outputs at the junction 138 and the microprocessor steps through these ratios while monitoring the output 137 from the comparator amplifier 134. When this output 137 changes state, the ratio of the voltage divider 120 equals the ratio of the voltage divider of the sensor 110.

Temperature Determination

A look-up table stored in microprocessor memory is accessed to determine the probe sensor temperature once the sensor voltage divider ratio is determined. This look-up table stores 512 ($2^9$) temperatures corresponding to 512 possible ratios of the voltage divider 120. When the comparator output 137 changes state in response to microprocessor manipulation of the status of pins P1–P9 the microprocessor 105 accesses the ratio corresponding to that controlled output and obtains a temperature value corresponding to that ratio.

In an analogous manner, the ambient air temperature sensed by the sensor 110' is monitored by as an output 137' from the comparator 134' changes in response to sensed temperature changes. The microprocessor 105 monitors changes in state from the comparator amplifier 134' at a separate input/output pin labeled "sensor 2" in FIG. 6.

Figure 7:
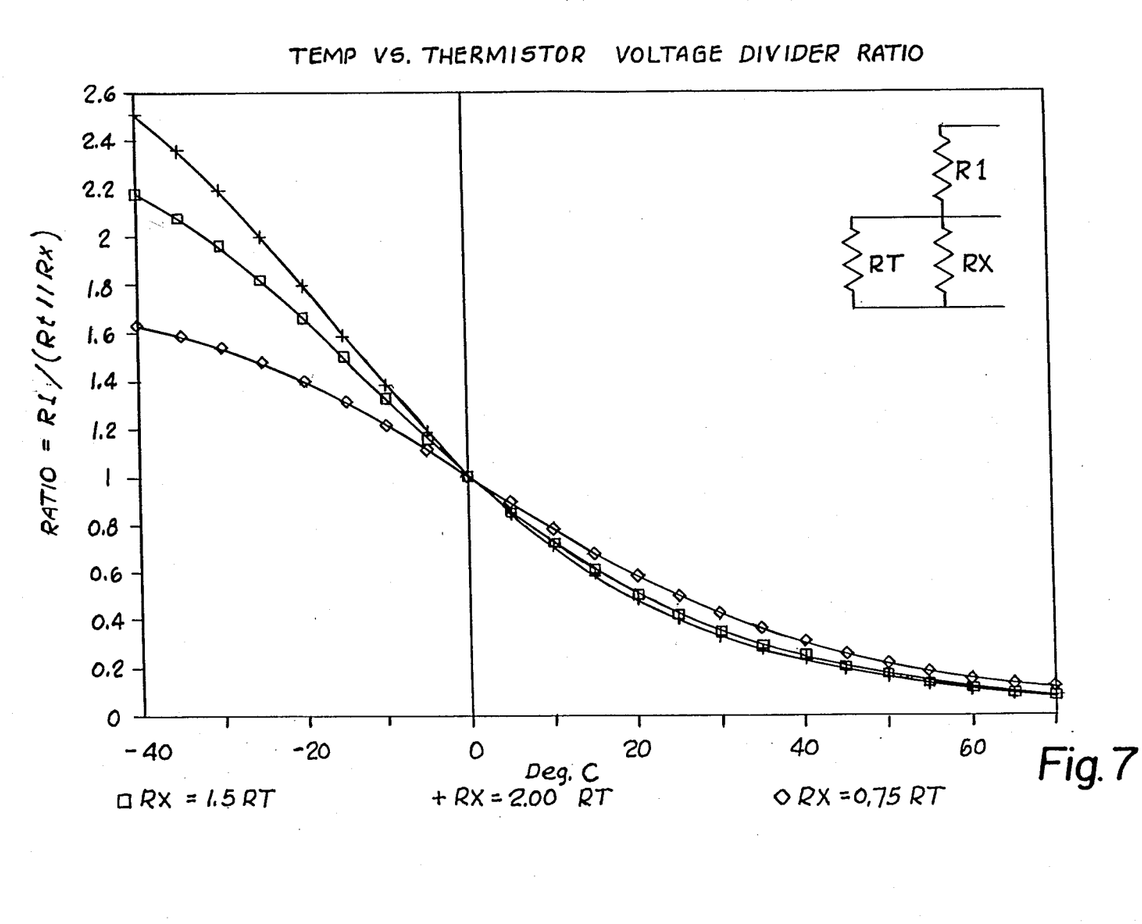
FIG. 7 is a graph showing resistance ratios of different sensors plotted against temperature.

FIG. 7 graphically depicts temperature response curves of three sensors constructed according to the invention wherein the thermistor resistances have all been determined in a bath at 0° C. and the respective resistors RX have been trimmed to produce different predetermined ratios relative to the measured resistance of the associated thermistor. Three different plots are presented, each corresponding to a different resistance value of a resistor RX coupled in parallel with a sensor thermistor. These three plots are for RX=1.5 RT, RX=2.00 RT, and RX=0.75 RT. The resistance ratio at a sensor temperature of 0° C. is precisely known because of the method of constructing the sensors. That is, the substrate was placed in a 0° C. bath and the thermistor resistance measured and recorded. The resistance ratio was produced by precision laser trimming the monolithic resistor elements R1, RX to produce the ratio when the thermistor resistance is at its 0° C. value. At 0° C., the resistance ratio of the sensor 110 is known to within approximately 0.1%. The remaining points on the three plots depicted in FIG. 7 are based upon variations in resistance ratios calculated from data provided by the thermistor manufacturer and reflect the slightly non-linear temperature response inherent in conventional thermistors. These ratios are equal to the resistance of the resistor element R1 divided by the parallel resistance of the thermistor RT and the resistor element RX or $$\frac{(R1(RT + RX))}{(RT) \cdot (RX)}.$$

The accuracy of these ratios plotted on the graph are very accurate near the calibrated point of interest, i.e., 0° C. Other points on the curves are plotted based upon the manufacturer's resistance data for the thermistor but are offset by a correction factor based upon the 0° C. ratio. It should be appreciated that although the curves of FIG. 7 are based up resistance ratios they are analogous to sensor output signal values over the range of temperatures depicted.

Choice of different resistance values of the resistor RX can widen or narrow the range of resistance ratios (and therefore the range of output signal values) over a temperature operating range of interest. For example, the specific values of RX and RX' chosen for the embodiment of FIG. 6 are based upon the choice of the microprocessor 105 used to sense temperature of the sensors 110, 110' and the purpose served by the sensor in question.

Since the sensor 110 detects the temperature of the outdoor heat exchanger in a heat pump system and primarily functions in connection with defrosting the heat exchanger, it may be desirable to construct the sensor 110 utilizing a resistor RX trimmed to produce a ratio of RX/RT of 2.0 since this relationship provides a pronounced, nearly linear, output signal characteristic between 0° C. and −40° C.

On the other hand the sensor 110' senses ambient air temperature and it may be advantageous to select a ratio of RX/RT=0.75 for that sensor since this RX value produces a relatively linear response to sensed temperature changes over a much wider temperature range.

It should be apparent that, by using the fabrication methods of the present invention, the output characteristics of sensors can readily be modified to suit the requirements of the sensor applications.

Additional details regarding this specific use of sensors constructed according to the invention are disclosed in co-pending U.S. patent application Ser. No. 074,907 to White entitled "Demand Defrost Control Method and Apparatus" filed July 17, 1987 and which is commonly assigned.

Although different embodiments of the invention have been illustrated and described in detail the invention is not to be considered limited to the precise constructions and practices disclosed. Various adaptations, modifications and uses of the invention may occur to those skilled in the art to which the invention relates. The invention is to cover hereby all such adaptations, modifications and uses which fall within the spirit or scope of the following claims.

We claim:

1. A method of manufacturing a temperature sensor comprising the steps of:
    forming a voltage divider having first and second connected segments wherein forming said first segment comprises mounting a thermistor element having a resistance that varies with temperature on a substrate and forming said second segment comprises depositing a monolithic resistor element onto the substrate;
    measuring the resistance of the thermistor element at a reference temperature and recording the measured resistance; and
    precisely trimming the monolithic resistor element to produce a precise resistance ratio between the first and second segments at said reference temperature.

2. The sensor manufacturing method of claim 1 wherein the first segment is formed by connecting a parallel monolithic resistor element in parallel to the thermistor and both the series coupled and parallel monolithic resistor elements are trimmed to precise resistance values.

3. The method claimed in claim 1 further including encapsulating said sensor in an elastomeric material.

4. The method claimed in claim 1 further including depositing said second segment on a substrate, connecting said thermistor to said substrate and supporting said substrate in a sensor housing.

5. A temperature probe comprising:
    (a) a temperature sensor comprising,
        (i) a substrate;
        (ii) a thermistor connected to the substrate;

(iii) a resistor element deposited on the substrate and electrically coupled to the thermistor to form a voltage divider;

(iv) at least one conductor for supplying power to the voltage divider; and (v) an output signal conductor connected to an output junction between said resistor and said thermistor;

(b) a probe housing at least partially surrounding said sensor with said substrate disposed within but spaced from said housing; and (c) a resiliently deformable body of material surrounding said temperature sensor for isolating said temperature sensor from mechanical stress applied to said probe housing.

6. A temperature probe as defined in claim 5 wherein said probe housing comprises a wall member defining a slot, said conductors supported by an insulating conduit engaged in said slot with said conduit and conductors supporting said sensor cantilever fashion in said housing during assembly of said probe.

7. The probe claimed in claim 5 further including a resiliently deformable grommet-like member engaged in said slot and firmly engaging said insulating conduit.

8. The sensor claimed in claim 5 further including a second resistance element deposited on said substrate and electrically coupled to said voltage divider in parallel with said thermistor.

9. A method of making precision temperature sensors comprising:

(a) forming electrically conductive circuit portions on a plurality of individual substrate regions;

(b) forming at least a resistor element in each of said substrate regions in electrically conductive engagement with respective circuit portions;

(c) attaching a discrete thermistor to each substrate region, each thermistor electrically coupled to a respective resistor element to form a voltage divider with an output junction between said resistance element and said thermistor;

(d) maintaining said substrate regions precisely known stable temperature;

(e) measuring the resistance of each thermistor at said temperature and recording the measured resistance; and (f) measuring the resistance of each resistor element and trimming each resistor element to alter the resistance thereof to a resistance value dictated by the measured thermistor resistance at said temperature.

10. The method claimed in claim 9 further including attaching conductors to said substrate.

11. The method claimed in claim 10 further including encapsulating said substrate in a resiliently flexible body of elastomeric material with said conductors extending from said body.

12. A method of making a temperature sensor comprising the steps of:

forming a voltage divider network comprising first and second series connected resistive segments and an interposed output junction;

the first segment comprising a thermistor element whose resistance changes as the temperature of the thermistor element changes and the second segment comprising a resistor element;

forming said second segment comprising forming said resistor element by depositing resistive material on a substrate to produce a monolithic resistor having a predetermined nominal resistance value;

transferring heat between said thermistor and a medium to establish and maintain an accurately determinable thermistor temperature;

measuring the resistance of the thermistor while at the accurately determinable temperature; and trimming the resistance of the deposited resistor to change the resistance value from said nominal value to a predetermined value dependent upon the measured resistance of said thermistor.

13. The method of claim 12 where the trimming step is performed by laser trimming the monolithic resistor to achieve the predetermined resistance value.

14. The method of claim 13 further comprising the step of encapsulating the voltage divider network in a moisture protective potting material.

15. The method of claim 14 wherein prior to encapsulating the substrate and voltage divider are positioned within a heat conductive housing.

16. The method of claim 12 where the thermistor and resistive material are mounted to a single substrate.

17. The method of claim 12 where the transferring step is performed by immersing the thermistor in a liquid bath having an accurately controlled temperature.

18. A temperature probe for monitoring temperature comprising substrate means, precision trimmed monolithic resistor means mounted on the substrate means, thermistor means electrically coupled to said monolithic resistor means to form a voltage divider, energizing means connected across the voltage divider for energizing the probe with a voltage and sensor means coupled to a junction between the monolithic resistor means and the thermistor means for monitoring a voltage at said junction related to the temperature of the thermistor means; said precision trimmed monolithic resistor means and said thermistor means having a precise resistance ratio at a reference temperature at which the resistance of the thermistor is precisely known.

19. The temperature sensor of claim 18 additionally comprising a thermally conductive enclosure for mounting the thermistor means and monolithic resistor means.

* * * * *